US009588685B1

(12) United States Patent
Watson et al.

(10) Patent No.: US 9,588,685 B1
(45) Date of Patent: Mar. 7, 2017

(54) DISTRIBUTED WORKFLOW MANAGER (71) Applicant: EMC Corporation, Hopkinton, MA (US)

(72) Inventors: Thomas L. Watson, Richardson, TX (US); Anoop G. Ninan, Milford, MA (US); William J. Elliott, IV, Holden, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 420 days.

(21) Appl. No.: 13/886,786

(22) Filed: May 3, 2013

(51) Int. Cl.
*G06Q 10/00* (2012.01)
*G06F 3/06* (2006.01)

(52) U.S. Cl.
CPC .......... *G06F 3/0604* (2013.01); *G06F 3/0655* (2013.01); *G06F 3/0683* (2013.01)

(58) Field of Classification Search
CPC ........ G06Q 10/00–50/00; G06Q 90/00; G06Q 99/00; G06F 1/00–21/00; H04L 1/00–69/00
USPC ............ 705/7.11–7.42; 717/100, 174; 718/1, 718/100; 707/600, 607, 608, 609–675, 707/912, 964; 709/201–203, 217–220
See application file for complete search history.

(56) References Cited

U.S. PATENT DOCUMENTS

| | | | | | |
|---|---|---|---|---|---|
| 5,325,519 | A | * | 6/1994 | Long | G06F 3/0601 714/15 |
| 5,630,047 | A | * | 5/1997 | Wang | G06F 11/1479 714/15 |
| 5,717,926 | A | * | 2/1998 | Browning | G06F 9/4843 718/103 |
| 5,734,837 | A | * | 3/1998 | Flores | G06Q 10/06311 705/7.13 |
| 5,826,239 | A | * | 10/1998 | Du et al. | 705/7.26 |
| 5,835,911 | A | * | 11/1998 | Nakagawa | G06F 8/65 |
| 5,922,078 | A | * | 7/1999 | Hirayama | G06F 11/1438 714/16 |

(Continued)

OTHER PUBLICATIONS

Shuen-Tai, Wang, Lin Yu-Ching, and Chang Hsi-Ya. "Developing a Web-Based Workflow Management System in Cloud Computing Platforms." World Academy of Science, Engineering and Technology, International Journal of Computer, Electrical, Automation, Control and Information Engineering 9.6 (2015): 1370-1374.*

(Continued)

*Primary Examiner* — Alan S Miller
(74) *Attorney, Agent, or Firm* — Krishnendu Gupta; Konrad R. Lee (57) ABSTRACT

A method for orchestrating a workflow, including one or more steps, for provisioning a data service on a data storage system, the data storage system including one or more sub-systems, the method comprising orchestrating the execution of the workflow on the data storage system by analyzing the workflow to determine a dependency of each of the one or more steps for provisioning the data service; and based on the dependency of each of the one or more steps, scheduling the one or more steps for execution on the one or more sub-systems of the data storage system, wherein a first step of the one or more steps scheduled on a first sub-system of the one or more sub-systems is scheduled in parallel with a second step of the one or more steps scheduled on a second sub-system of the one or more sub-systems.

18 Claims, 11 Drawing Sheets

(56) References Cited

U.S. PATENT DOCUMENTS

| | | | | |
|---|---|---|---|---|
| 5,960,404 | A * | 9/1999 | Chaar | G06F 9/5038 705/7.15 |
| 6,052,684 | A * | 4/2000 | Du | G06F 9/52 |
| 6,230,200 | B1 * | 5/2001 | Forecast et al. | 709/226 |
| 6,321,144 | B1 * | 11/2001 | Crombez | B60L 15/2009 303/152 |
| 6,385,644 | B1 | 5/2002 | Devine | G06F 9/465 709/201 |
| 6,397,191 | B1 * | 5/2002 | Notani | G06Q 20/123 705/50 |
| 6,397,192 | B1 * | 5/2002 | Notani | G06F 15/025 235/375 |
| 6,442,528 | B1 * | 8/2002 | Notani | G06F 9/46 705/7.12 |
| 7,093,088 | B1 * | 8/2006 | Todd et al. | 711/162 |
| 7,350,188 | B2 * | 3/2008 | Schulz | G06Q 10/06 709/205 |
| 7,434,022 | B1 * | 10/2008 | Scharland et al. | 711/173 |
| 7,945,669 | B2 * | 5/2011 | Bober et al. | 709/226 |
| 7,962,590 | B1 * | 6/2011 | Or | G06F 8/24 709/223 |
| 8,346,735 | B1 * | 1/2013 | Tang et al. | 707/675 |
| 8,347,388 | B1 * | 1/2013 | Dutch et al. | 726/24 |
| 8,387,066 | B1 * | 2/2013 | Becher et al. | 718/106 |
| 8,898,442 | B2 * | 11/2014 | Stoitsev | G06F 8/10 705/7.36 |
| 9,026,577 | B1 * | 5/2015 | Johnston | G06Q 10/0633 709/202 |
| 2001/0034558 | A1 * | 10/2001 | Hoskins | G05B 19/045 700/13 |
| 2002/0022982 | A1 * | 2/2002 | Cooperstone et al. | 705/7 |
| 2002/0107914 | A1 * | 8/2002 | Charisius | G06Q 10/06 709/203 |
| 2002/0143943 | A1 * | 10/2002 | Lee | G06F 21/41 709/225 |
| 2002/0188653 | A1 * | 12/2002 | Sun | G06F 11/1438 709/201 |
| 2003/0005299 | A1 * | 1/2003 | Xia | G06F 21/31 713/171 |
| 2003/0093688 | A1 * | 5/2003 | Helgesen | G06F 8/68 726/27 |
| 2004/0088737 | A1 * | 5/2004 | Donlan et al. | 725/135 |
| 2004/0158549 | A1 * | 8/2004 | Matena | G06F 11/2097 |
| 2004/0243699 | A1 * | 12/2004 | Koclanes | H04L 29/06 709/224 |
| 2006/0053183 | A1 * | 3/2006 | Eaton | G06F 11/1482 |
| 2006/0074704 | A1 * | 4/2006 | Shukla | G06F 8/10 717/104 |
| 2006/0074737 | A1 * | 4/2006 | Shukla | G06F 8/36 705/7.27 |
| 2006/0195347 | A1 * | 8/2006 | Bultmeyer | G06F 21/445 705/7.26 |
| 2007/0083588 | A1 * | 4/2007 | Keller et al. | 709/202 |
| 2009/0049422 | A1 * | 2/2009 | Hage | G06F 8/10 717/104 |
| 2009/0125366 | A1 * | 5/2009 | Chakraborty | G06Q 10/087 717/117 |
| 2009/0172670 | A1 * | 7/2009 | Bobak | G06Q 10/06 718/100 |
| 2009/0172671 | A1 * | 7/2009 | Bobak et al. | 718/100 |
| 2009/0172682 | A1 * | 7/2009 | Bobak et al. | 718/103 |
| 2010/0125826 | A1 * | 5/2010 | Rice | G06F 17/30867 717/107 |
| 2010/0145910 | A1 * | 6/2010 | Zhao | G06F 17/30348 707/620 |
| 2010/0205159 | A1 * | 8/2010 | Li | G06Q 10/06 707/694 |
| 2010/0332371 | A1 * | 12/2010 | Jensen | G06Q 40/04 705/37 |
| 2011/0145783 | A1 * | 6/2011 | Seshan | G06F 8/10 717/105 |
| 2011/0219218 | A1 * | 9/2011 | Addala | G06F 3/048 712/228 |
| 2011/0258635 | A1 * | 10/2011 | Resende, Jr. | G06F 9/5038 719/313 |
| 2011/0314075 | A1 * | 12/2011 | Boldyrev | G06F 9/5066 709/201 |
| 2014/0053157 | A1 * | 2/2014 | Zhao | G06F 9/485 718/100 |
| 2014/0074544 | A1 * | 3/2014 | Seetharam et al. | 705/7.26 |

OTHER PUBLICATIONS

Oba, Michiko, and Norihisa Komoda. "Multiple type workflow model for enterprise application integration." System Sciences, 2001. Proceedings of the 34th Annual Hawaii International Conference on. IEEE, 2001.*

GitHub Storm Cluster Tutorial, https://github.com/nathanmarz/storm/wiki/Tutorial downloaded Jul. 31, 2013, 8 pages.

"ZooKeeper" product information guide, Copyright © 2008-2013 The Apache Software Foundation, 9 pages.

* cited by examiner

DISTRIBUTED WORKFLOW MANAGER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

CROSS REFERENCE TO RELATED APPLICATIONS

This Application is related to U.S. patent application Ser. No. 13/630,455 entitled "SINGLE CONTROL PATH" filed on Sep. 28, 2012, Ser. No. 13/631,030 entitled "METHOD AND APPARATUS FOR FEDERATING A PLURALITY OF ONE BIG ARRAYS" filed on Sep. 28, 2012, Ser. No. 13/631,039 entitled "METHOD AND APPARATUS FOR AUTOMATED INFORMATION LIFECYCLE MANAGEMENT USING A FEDERATION OF ARRAYS" filed on Sep. 28, 2012, Ser. No. 13/631,055 entitled "METHOD AND APPARATUS FOR FEDERATED IDENTITY AND AUTHENTICATION SERVICES" filed on Sep. 28, 2012, Ser. No. 13/631,190 entitled "APPLICATION PROGRAMMING INTERFACE" filed on Sep. 28, 2012, Ser. No. 13/631,214 entitled "AUTOMATED POLICY BASED SCHEDULING AND PLACEMENT OF STORAGE RESOURCES" filed on Sep. 28, 2012, Ser. No. 13/631,246 entitled "DISTRIBUTED SYSTEM SOFTWARE INFRASTRUCTURE" filed on Sep. 28, 2012, and Ser. No. 13/886,789 entitled "PORT PROVISIONING SYSTEM", Ser. No. 13/886,892 entitled "SCALABLE INDEX STORE", Ser. No. 13/886,915 entitled "SCALABLE OBJECT STORE", Ser. No. 13/886,687 entitled "STORAGE PROVISIONING IN A DATA STORAGE ENVIRONMENT", and Ser. No. 13/886,644 entitled "STORAGE PROVISIONING IN A DATA STORAGE ENVIRONMENT" filed on even date herewith, the teachings of which applications are hereby incorporated herein by reference in their entirety.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A method, system, and computer program product for orchestrating a workflow, including one or more steps, for provisioning a data service on a data storage system, the data storage system including one or more sub-systems, the method, system, and computer program product comprising orchestrating the execution of the workflow on the data storage system by analyzing the workflow to determine a dependency of each of the one or more steps for provisioning the data service; and based on the dependency of each of the one or more steps, scheduling the one or more steps for execution on the one or more sub-systems of the data storage system, wherein a first step of the one or more steps scheduled on a first sub-system of the one or more sub-systems is scheduled in parallel with a second step of the one or more steps scheduled on a second sub-system of the one or more sub-systems.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be created in the system for the purposes of security isolation.

A neighborhood may represent a fault domain within a network. In many embodiments, a plurality of data centers may be combined to create a federation. In some embodiments, the federation failures may occur that may affect the availability of resources. In certain embodiments, the data centers or federation may account for the failures by segmenting the infrastructure into different fault domains. In some embodiments, each fault domain may be designed to be isolated from other fault domains, while part of the same data center, so that each failure within one fault domain does not affect other fault domains.

A transport zone may represent a region of connectivity within a neighborhood. In many embodiments, a transport zone may include a network, such as a SAN network or an IP network. In various embodiments, a transport zone may include addresses (such as a World Wide Names (WWN) that may be in the network for both hosts and storage array ports. In some embodiments, addresses for hosts may include initiator addresses and/or IP addresses. In certain embodiments, a data storage system may be enabled to determine what initiators may be connected to what storage ports by analyzing a transport zone.

An initiator may be an address used in the SAN networking. In many embodiments, an initiator may include a Fiber Channel (FC) initiator and/or an iSCSI initiator. In various embodiments, FC initiators may use a WWN address as a unique identifier in a data storage system. In various embodiments, a WWN may include a port address and/or node address. In certain embodiments, an iSCSI initiator may include addresses of type IQN and EUI.

A project may be a resource organization abstraction that maps resources to applications, virtual data centers, departments, or other entities. In some embodiments, a user may create their own projects, and may associate multiple resources from different data services with the projects. In most embodiments, resources from one project maybe shared between users under the same tenant.

A Class of Service may represent high-level capabilities and services that may be created by administrators through composition of resource attributes and quality of services, including level of protection, availability, access protocol, performance, and additional storage/data services, such as versioning/snap, backup, remote replication, data reduction, encryption, etc. In many embodiments, users or tenants may select from a menu of Class of Service entries when creating a volume.

Generally, a data storage array or system may be one or more physical boxes or a cluster of physical boxes. In conventional systems, the data storage array or system may have one control path and data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Figure 1:
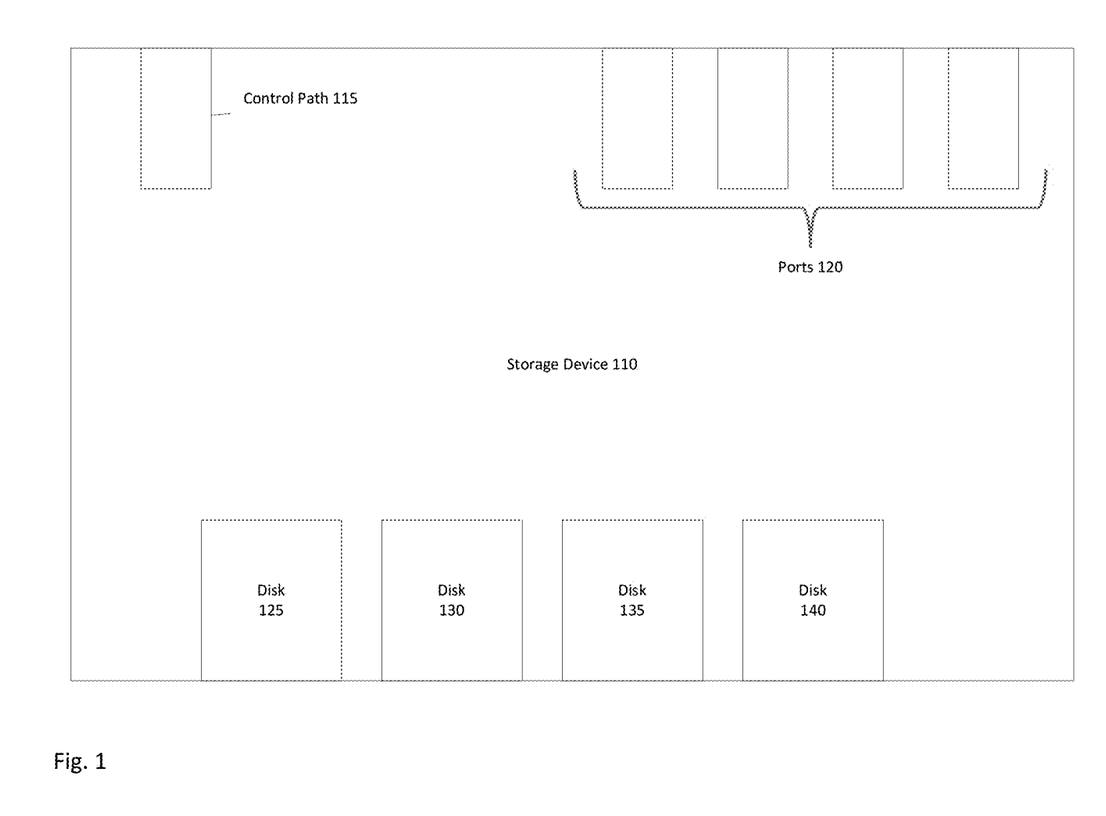
FIG. 1 is a simplified illustration of a data storage device, in accordance with an embodiment of the present disclosure.

Refer, now to the example embodiment of FIG. 1 which illustrates a sample storage device. Storage device 110 has control path 115, ports 120, and disks 125, 130, and 135. Control path 115 enables a user to interface with storage device 110. Control path 115 enables a user to access disks 125, 130, and 135, via the services storage device 110 offers, through one or more of ports 120.

In many embodiments, the current disclosure may enable workflow management of various tasks, within a data storage system, comprised of various steps. In various embodiments, the current embodiment may enable a workflow service to decompose one or more large or complex computing operations into a set of smaller steps. In some embodiments, the current disclosure may enable smaller steps to be orchestrated to execute serially. In other embodiments, the current disclosure may enable smaller steps to be orchestrated to run in parallel groups. In certain embodiments, when a set of steps have completed successfully, the complex operation may have been completed.

In many embodiments, the current disclosure may enable a data storage system to execute individual steps in parallel on different loosely coupled computer systems within the data storage system. In various embodiments, if a computer system fails, the step(s) it was executing may be automatically restarted on a different computer system to avoid failure of the workflow, provided that the internal operations of the steps are idempotent. In certain embodiments, idempotent may be the property of certain operations in mathematics and computer science that may be applied multiple times without changing the results beyond the initial application.

In some embodiments, the current disclosure may enable a workflow service to scale to have a very large number of workflows running in parallel. In other embodiments, within each workflow, a very large number of steps may be running in parallel if applicable to the problem domain. In various embodiments, the failure of one or more of the underlying computing systems may not cause a workflow to fail. In certain embodiments, each step that may have terminated pre-maturely may restart on surviving computer systems.

In various embodiments, a workflow service may monitor an execution of a workflow for completion (i.e., monitoring whether each step as completed and/or failed during execution). In some embodiments, if a workflow step resulted in an error status, a workflow service may be enabled to dynamically add one or more steps to a workflow to undo (i.e., rollback) the one or more operations that may have been previously accomplished. In certain embodiments, a rollback step may be derived from the dependencies within a workflow by reversing the corresponding dependencies within the workflow in executing the rollback step.

In many embodiments, when the Orchestration controller initially creates a Workflow, for each Step an execute method may be specified. In various embodiments, an optional rollback method may be specified for each Step. In some embodiments, the rollback method may remain attached to that Step, but that Step defines the execution method. In certain embodiments, if something fails and rollback is initiated, the workflow service, for each step in the workflow that has been completed, may determine if a rollback step was specified. In other embodiments, if a rollback step was identified, may insert a new additional Step into the Workflow to execute the rollback Step. In certain embodiments, the ordering of the Rollback Steps may be determined by reversing the dependency graph of the original Steps. In various embodiments, a method may mean an identification of a Java class, a function to be executed within that class, and the parameters for that function. In many embodiments, when a node fails while executing a step, the step may be restarted on another node in a data storage system. In other embodiments, if a step fails, the workflow services may initiate rollback steps to undo any steps completed in the workflow. In certain embodiments, if a step fails, the node may initiate rollback steps to undo any steps completed in the workflow.

In many embodiments, the current disclosure may enable the orchestration of actions across multiple devices and controller service calls for a multitude of services, such as provisioning of one or more data services from a data storage system. In other embodiments, the current disclosure may enable the orchestration of actions across multiple devices and controller service calls for one or more applications, such as Recover Point and/or Vplex. In some embodiments, the current disclosure may allow an orchestration controller to be designed that it may manage the activities of other controllers that may need to be invoked (i.e., downstream controllers). In various embodiments, a workflow service may provide many facilities to an orchestration controller, such enabling creation of an empty workflow, a call to define the workflow steps that may be executed for the workflow as part of an overall plan. In some embodiments, the workflow service may enable the ability to create dependencies such that a particular step within a workflow may not be queued for execution until a prerequisite step and/or group of steps has completed successfully. In other embodiments, a workflow service may enable the ability to define a group of steps that may execute in parallel. In many embodiments, a workflow service may enable the ability to define rollback steps that may be initiated should one or more of the execution steps fail. In various embodiments, once a workflow and its steps are defined, execution of the workflow may be automatic without any intervention or need for the orchestration controller to be involved. In various embodiments, a definition of a rollback method may be included in the step that may be executed. In certain embodiments, if a rollback step and/or method may become necessary, a separate step may be created where the executed method is the rollback method from the original Step definition.

In many embodiments, an orchestration controller may be a controller that works in conjunction with a workflow service to define a workflow. In various embodiments, an orchestration method may be included in the orchestration controller and may define and execute a workflow. In some embodiments, an orchestration method may comprise of creating a new workflow, creating steps that should execute in the workflow, executing the workflow, and handling any final results. In certain embodiments, a workflow service may enable creation of new workflows for an orchestration controller and may manage the execution of a workflow once the steps are defined. In many embodiments, a workflow may include an object representing the current state of the workflow that is persistent in each node of a data storage system. In some embodiments, a workflow may provide methods for defining steps in a workflow, and executing the workflow, and retrieving status when the workflow has completed. In various embodiments, a workflow step (also referred to as a step) may represent one specific step in a workflow. In some embodiments, a step may be a call to a downstream controller method that may be performed via a dispatcher. In many embodiments, a dispatcher may receive one or more steps and place each step in a location on a node within a data storage system that may be accessible by each node within the data storage system. In certain embodiments, a downstream controller may be a controller that may be called by a node within a data storage system executing a step necessary to completion of the workflow. In other embodiments, downstream controllers may require minimal interaction with the workflow service. In some embodiments, a downstream controller may be invoked on behalf of a workflow step.

In many embodiments, an orchestration controller may call a workflow service to get a new workflow structure. In various embodiments, an orchestration controller may create one or more steps to create a plan for a workflow. In some embodiments, a plan may include one or more steps dependent on each other. In certain embodiments, with dependent steps, one step may not be executed until one or more steps has completed execution. In many embodiments an orchestration controller may execute a plan by sending the workflow to a workflow service. In various embodiments, once a workflow service receives a workflow, the workflow service determines which steps are available to execute (i.e., without other dependency or dependencies already executed) and sends each available step to a dispatcher. In certain embodiments, a dispatcher may call downstream controllers to execute the one or more steps received from the workflow service.

In many embodiments, the current disclosure may enable execution of one or more workflows in a data storage system including an implementation of a workflow service and a dispatcher service. In various embodiments, a data storage system may be referred to as a loosely coupled computer system. In certain embodiments, each data storage system may include one or more nodes. In various embodiments, a dispatcher may be used to manage one or more distributed work queues. In some embodiments, a dispatcher may be enabled to queue one or more workflow steps. In certain embodiments, a dispatcher may place one or more steps in a node of the computer system where each of the steps may be available to each node of the computer system. In other embodiments, a node may select one or more steps to execute. In various embodiments, a node executing a specified step may lock the specified step such that another node within the data storage system may not be tasked with the same step. In many embodiments, a lock on a step may be created such that if a node within a data storage system holding the lock fails, each lock held by the failing node may be automatically released, which may cause another node in the computer system to restart execution of the workflow steps that were running on the failed node in the computer system. In various embodiments, a dispatcher may be enabled to place one or more steps in a location on a node in computer system where each node may be able to access the one or more steps. In certain embodiments, a dispatcher may be enabled to restart one or more steps on a second node in a data storage array if the one or more steps previously failed. In many embodiments, a workflow service may manage dependencies between steps within a workflow, such that when a dependency exists, a step may not run until previous dependent steps have been completed. In certain embodiments, the various steps that may be executing on a failed node may be restarted on a plurality of nodes within the computer system. In other embodiments, each step that may have been on the failing node may be restarted independently and execution of each restarted step may not happen on the same new node.

In many embodiments, the current disclosure may enable rollback of a workflow execution. In various embodiments, a workflow may fail while executing. In certain embodiments, the current disclosure may enable a data storage system to roll back steps of a workflow if the workflow failed while executing. In some embodiments, the data storage system may cancel subsequent steps planned in a workflow. In other embodiments, a data storage system may execute rollback steps to undo previously executed steps within a workflow. In many embodiments, a data storage system may analyze a workflow to determine dependencies within the workflow and execute rollback steps taking each dependency into account. In various embodiments, a rollback step may be a step that undoes the actions of a corresponding step. For example, in an embodiment, a workflow having a first step, creating a volume, has a rollback first step, removing a volume, where the rollback first step undoes the actions of the first step. In certain embodiments, each step and rollback step may be correlated to rollback one or more workflows. In other embodiments, where dependencies may exist, a workflow, comprising of Step B which is dependent on Step A, may be reversed to rollback the executed steps of the workflow. (i.e., rollback step B would be executed and completed before rollback Step would be allowed to be executed).

Figure 2:
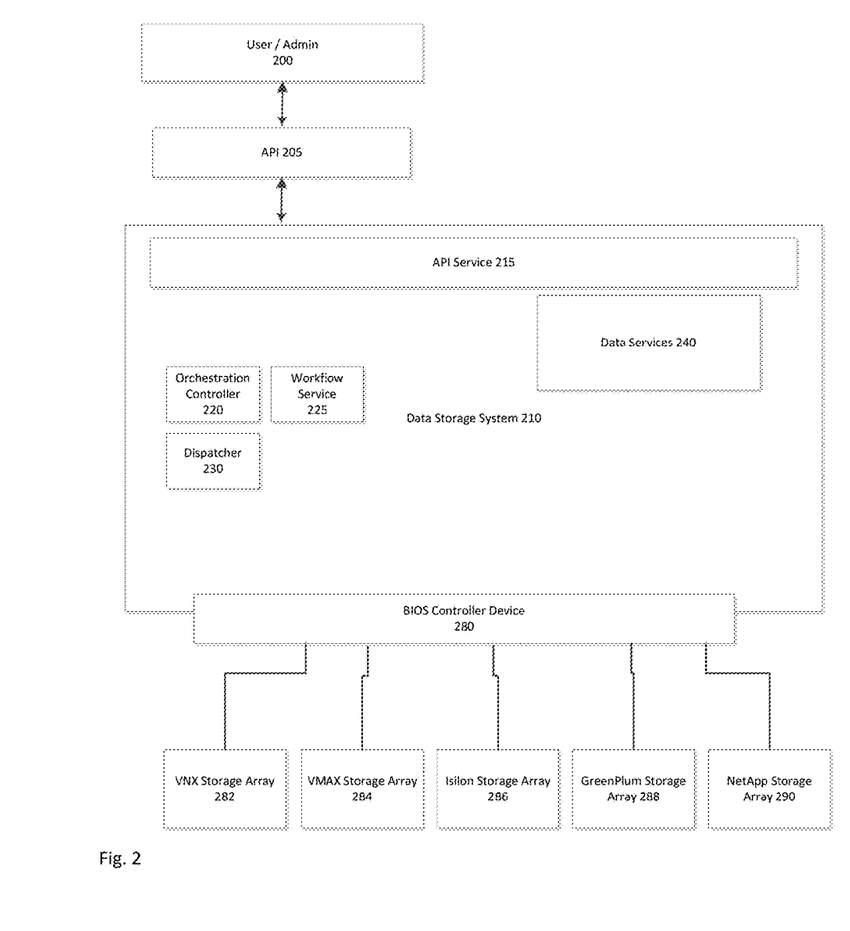
FIG. 2 is a simplified illustration of a data storage system, in accordance with an embodiment of the present disclosure.

Refer now to the example embodiment of FIG. 2. FIG. 2 is a simplified illustration of a data storage system, in accordance with an embodiment of the present disclosure. As shown in FIG. 2, API Service 215 enables external access to User/Administrator 200 through API 205. API Service 215 communicates requests to data storage system 210. API Service 215 enables access to modules within data storage system 210, such as data services 240, BIOS Controller device 280, orchestration controller 220, workflow service 225, and Dispatcher 230. As shown, orchestration controller 220 enables creation of one or more workflows enabled to be executed by workflow service 225. In this embodiment, workflow service is enabled to execute each workflow by queuing one or more steps, of the workflow, at dispatcher 230. As shown, dispatcher 230 is enabled to call one or more downstream controllers to execute the one or more queued steps of a workflow. In this embodiment, calling one or more downstream controller may include communicating with BIOS Controller Device 280, VNX storage array 282, VMAX storage array 284, Isilon storage array 286, Greenplum storage array 288, and/or NetApp storage array 290. In many embodiments, a dispatcher may be enabled to call one or more downstream controllers on other nodes of the data storage system. In various embodiments, a workflow may be enabled to create a step that invokes a different orchestration controller to create sub-workflows.

Figure 3:
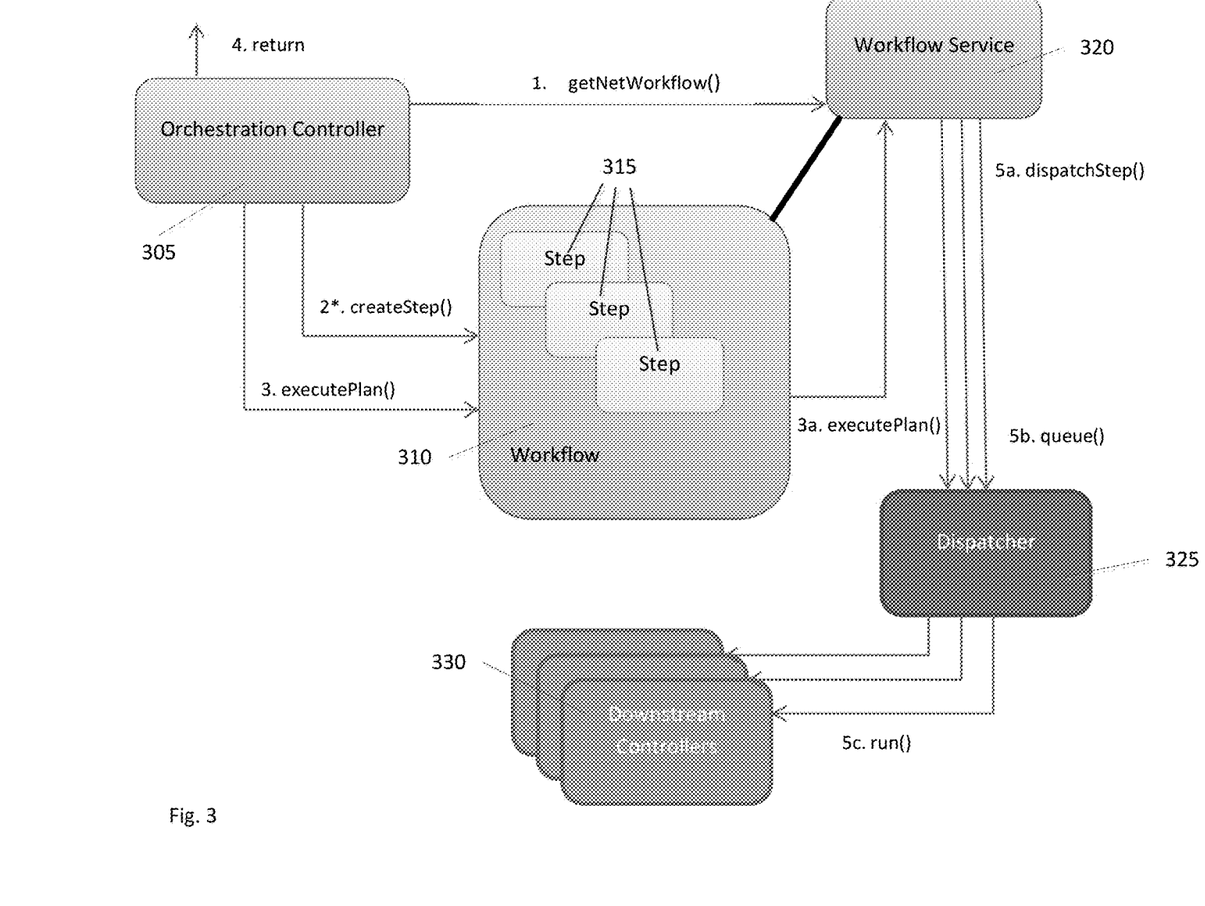
FIG. 3 is a simplified flowchart showing interactions of components within a data storage system within a data storage system, in accordance with an embodiment of the present disclosure.

Refer now to the example embodiment of FIG. 3. FIG. 3 is a simplified flowchart showing interactions of components within a data storage system, in accordance with an embodiment of the present disclosure. As shown, orchestration controller 305 is given a task to execute. Orchestration controller 305 queries workflow service 320 to obtain an empty workflow 310. Orchestration controller 305 decomposes the task into one or more steps 315. Orchestration controller sends completed workflow 310 to workflow service 320 to begin execution. In this embodiment, workflow service 320 analyzes received workflow 310 and determines an order of execution of steps 315. In many embodiments each step may be enabled to be executed in parallel. In some embodiments, each step may be dependent on one or more steps. As shown, Workflow service 320 dispatches each of the steps 315 to be queued by dispatcher 325. In this embodiment, Dispatcher 325 calls one or more downstream controllers 330 to execute each respective step. In various embodiments, each downstream controller may reside on one or more nodes of the data storage system. In some embodiments, each node may be enabled to execute one or more steps affecting one or more nodes within the data storage system.

Figure 4:
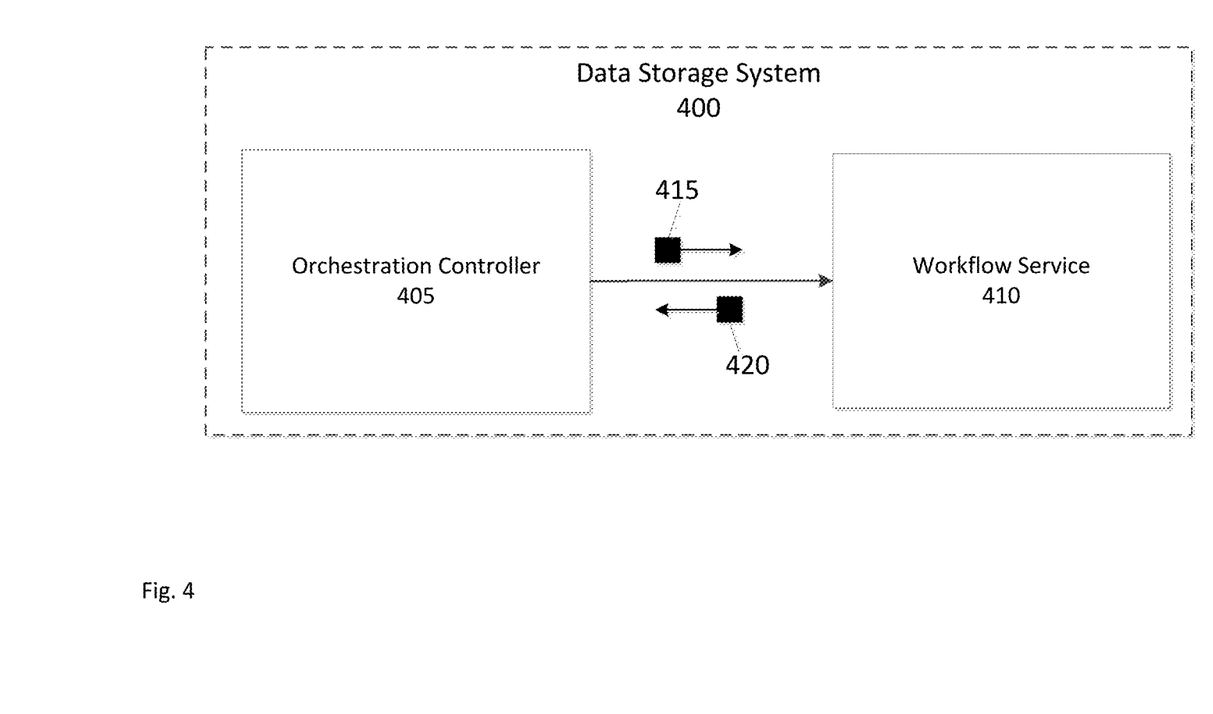
FIG. 4 is a simplified illustration of communication between components in a data storage system, in accordance with an embodiment of the present disclosure.

Refer now to the example embodiment of FIG. 4. FIG. 4 is a simplified illustration of the communication between an orchestration controller and a workflow service, in accordance with an embodiment of the present disclosure. As shown, data storage system 400 includes an orchestration controller 405 and workflow service 410. Orchestration controller 405 requests an empty workflow structure in message 415. Workflow service 410 creates a workflow structure and sends the workflow structure to orchestration controller 405 in message 420.

Figure 5:
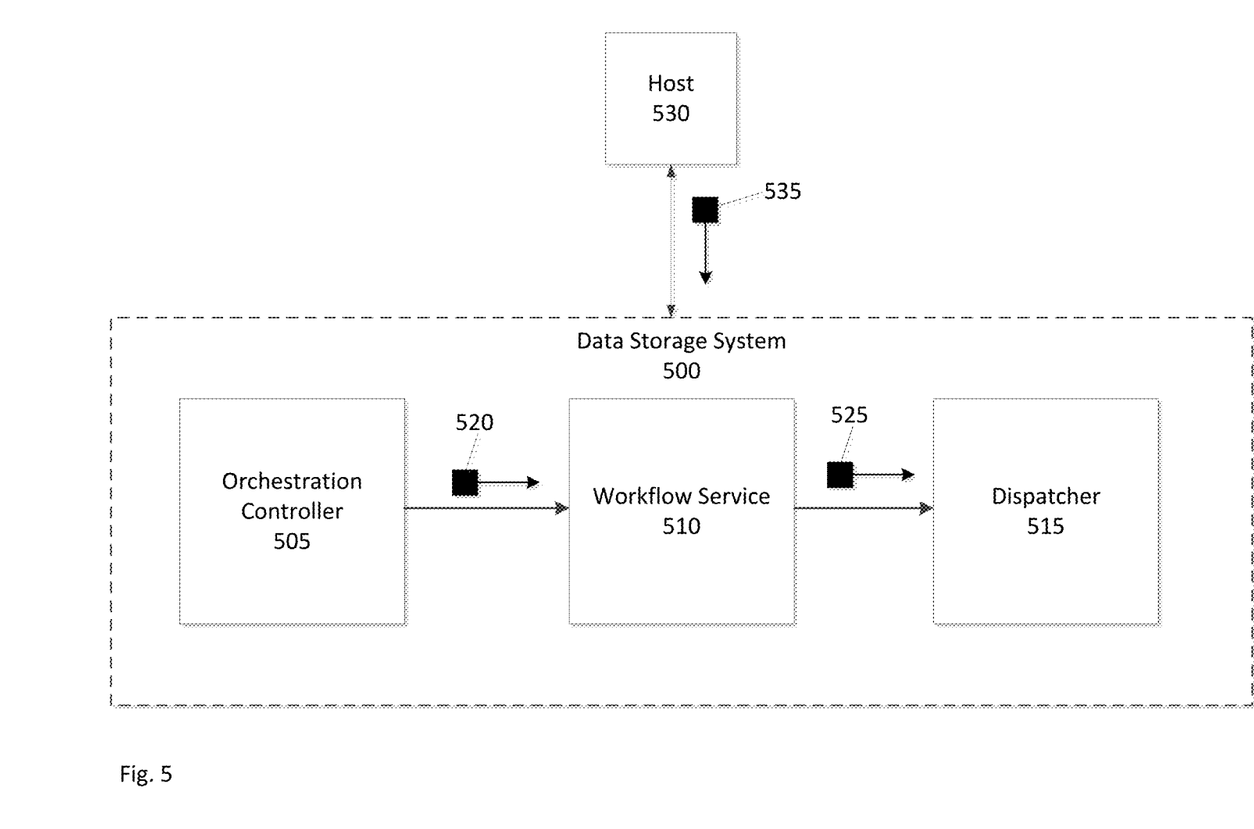
FIG. 5 is an alternate simplified illustration of communication between components in a data storage system, in accordance with an embodiment of the present disclosure.

Refer now to the example embodiment of FIG. 5. FIG. 5 is an alternate simplified illustration of the communication between an orchestration controller and a workflow service, in accordance with an embodiment of the present disclosure. As shown, data storage system 500 includes an orchestration controller 505, workflow service 510, and dispatcher 515. In this embodiment, data storage system 500 is in communication with Host 530. Host 530 sends data service request, in message 535, to data storage system 500. As shown, data storage system 500 is enabled to command orchestration controller 505 to execute one or more tasks to complete data service request. Orchestration controller 505 populates a workflow plan which includes one or more steps to complete each task required to complete the data service request from host 530. In this embodiment, Orchestration controller 505 sends the workflow plan to workflow service 510 in message 520. Workflow service 510 is enabled to analyze the workflow plan to determine the dependency of steps contained within and to determine what rollback steps may be required if execution of the workflow plan fails. Workflow service 510 is enabled to decompose the workflow plan into individual steps and sends each individual step to dispatcher 515 using message 525. In this embodiment, dispatcher 515 is enabled to place each step on a node in data storage system 500 which is accessible to each node within data storage system 500. As shown, each node within data storage system 500 is enabled to execute each individual step by calling one or more downstream controllers.

Figure 6:
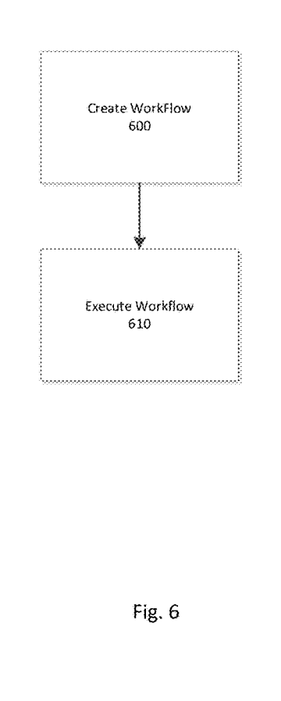
FIG. 6 is an example embodiment of a method of managing a workflow in a data storage system, in accordance with an embodiment of the present disclosure.

Refer now to the example embodiments of FIGS. 5 and 6. FIG. 6 is an example embodiment of a method of managing a workflow in a data storage system, as shown in FIG. 5, in accordance with an embodiment of the present disclosure. As shown, data storage system 500 includes an orchestration controller 505, workflow service 510, and dispatcher 515. In this embodiment, data storage system 500 is in communication with Host 530. In this embodiment, orchestration controller 505 creates a workflow (Step 600) comprised of one or more steps enabled to complete a requested task, in message 535, from host 530. As shown, Orchestration controller 505 sends the workflow to workflow service 510 using message 520. In this embodiment, workflow service 510 executes the workflow (Step 610) to accomplish the task received from host 530.

Figure 7:
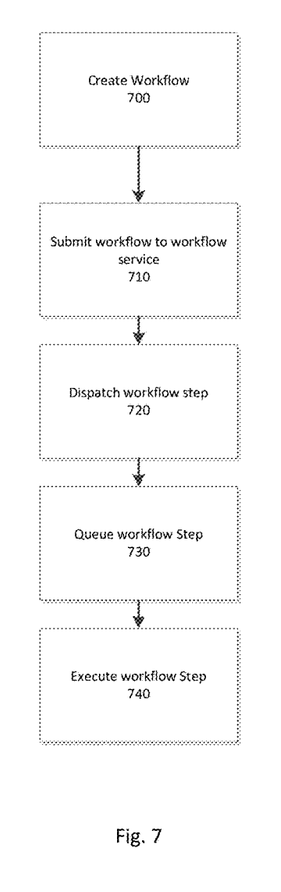
FIG. 7 is an alternate example embodiment of a method of managing a workflow in a data storage system, in accordance with an embodiment of the present disclosure.

Refer now to the example embodiments of FIGS. 5 and 7. FIG. 7 is an alternate example embodiment of a method of managing a workflow in a data storage system, as shown in FIG. 5, in accordance with an embodiment of the present disclosure. As shown, data storage system 500 includes an orchestration controller 505, workflow service 510, and dispatcher 515. In this embodiment, data storage system 500 is in communication with Host 530. In this embodiment, orchestration controller 505 creates a workflow (Step 700) including one or more steps required to complete a task. Orchestration controller 505 submits the workflow to workflow service 510 (Step 710) using message 520. As shown, workflow service 510 analyzes the workflow and decomposes the workflow into one or more steps. Workflow service 510 dispatches each workflow step (Step 720) to dispatcher 515. In this embodiment, dispatcher 515 queues each workflow step (Step 730). In this embodiment, periodically, a node within data storage system 500 determines if one or more threads are available to run one or more steps of a workflow. If one or more threads are available, the node is enabled to use the one or more threads to call a downstream controller to execute each workflow step (Step 740). In various embodiments, a data storage system may include one or more computer systems, also referred to as nodes, in a network of computer systems s. In many embodiments, a downstream controller may be located locally or remotely. In various embodiments, a downstream controller located locally may exist on the same node as the workflow is initiated. In some embodiments, a downstream controller located remotely may exist on a separate node from the node where the workflow is initiated.

Figure 8:
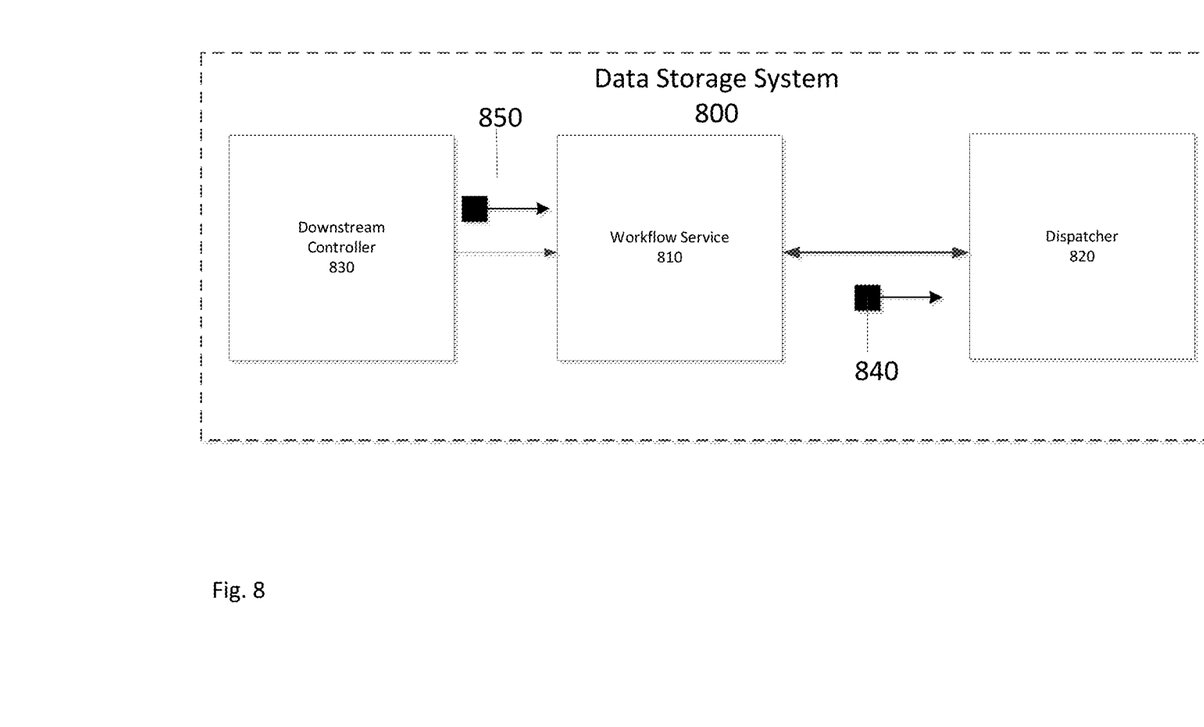
FIG. 8 is a further alternative simplified illustration of communication between components within a data storage system, in accordance with an embodiment of the present disclosure.

Refer now to the example embodiment of FIG. 8. FIG. 8 is a further alternative simplified illustration of the communication within a data storage system, in accordance with an embodiment of the present disclosure. As shown, data storage system 800 includes workflow service 810, downstream controller 830, and dispatcher 820. In FIG. 8, downstream controller 830 is enabled to communicate status information to workflow service 810. In various embodiments, a downstream controller may be enabled to communicate whether a step has been completed or whether an error has occurred. In some embodiments, after receiving a completed execution status from a downstream controller, a workflow service may be enabled to execute subsequent steps within a workflow plan. In this embodiment, when downstream controller 830 encounters an error while executing one or more steps, downstream controller 830 is enabled to notify workflow service 810 of the error using message 850. As shown, workflow service 810 is enabled to analyze the error and determine whether rollback steps should be taken and whether subsequent steps should be cancelled. In this embodiment, workflow service 810 is enabled to send rollback steps to dispatcher 820 using message 840. In many embodiments, a workflow server may keep track of dependencies and rollback steps for a workflow plan. In various embodiments, if a step irrecoverably fails, a workflow service may be enabled to execute rollback steps to place a data storage system in the same condition as before the workflow plan was initiated. In many embodiments, once a workflow has been completed, a workflow service may calculate a status of the workflow and return the status to the orchestration controller which originally requested the workflow.

In many embodiments, the calculated completion status of a workflow may be recorded within the data storage system. In various embodiments, an orchestration controller may be enabled to register a callback function that may be enabled to be called once a workflow terminates. In certain embodiments, an orchestration controller may exist after initiating a workflow. In other embodiments, a node may periodically check and determine if one or more workflows have failed or completed execution.

Figure 9:
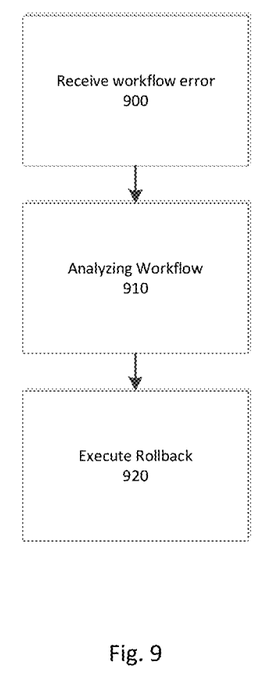
FIG. 9 is an example embodiment of a method of managing rollback of a workflow in a data storage system, in accordance with an embodiment of the present disclosure.

Refer now to the example embodiments of FIGS. 8 and 9. FIG. 9 is a further alternate example embodiment of a method of managing a workflow in a data storage system, as shown in FIG. 8, in accordance with an embodiment of the present disclosure. As shown, data storage system 800 includes workflow service 810, downstream controller 830, and dispatcher 820. Workflow service 810 receives workflow error in message 850 (Step 900) from downstream controller 830. In this embodiment, Workflow service 810 analyzes the workflow (Step 910) to determine whether or not rollback steps should be executed. Workflow service 810 determines that rollback steps should be executed and executes rollback (Step 920) by sending each rollback step to dispatcher 820 using message 840. In this embodiment, a node within data storage system 800 calls one or more downstream controllers to execute each rollback step.

Figure 10:
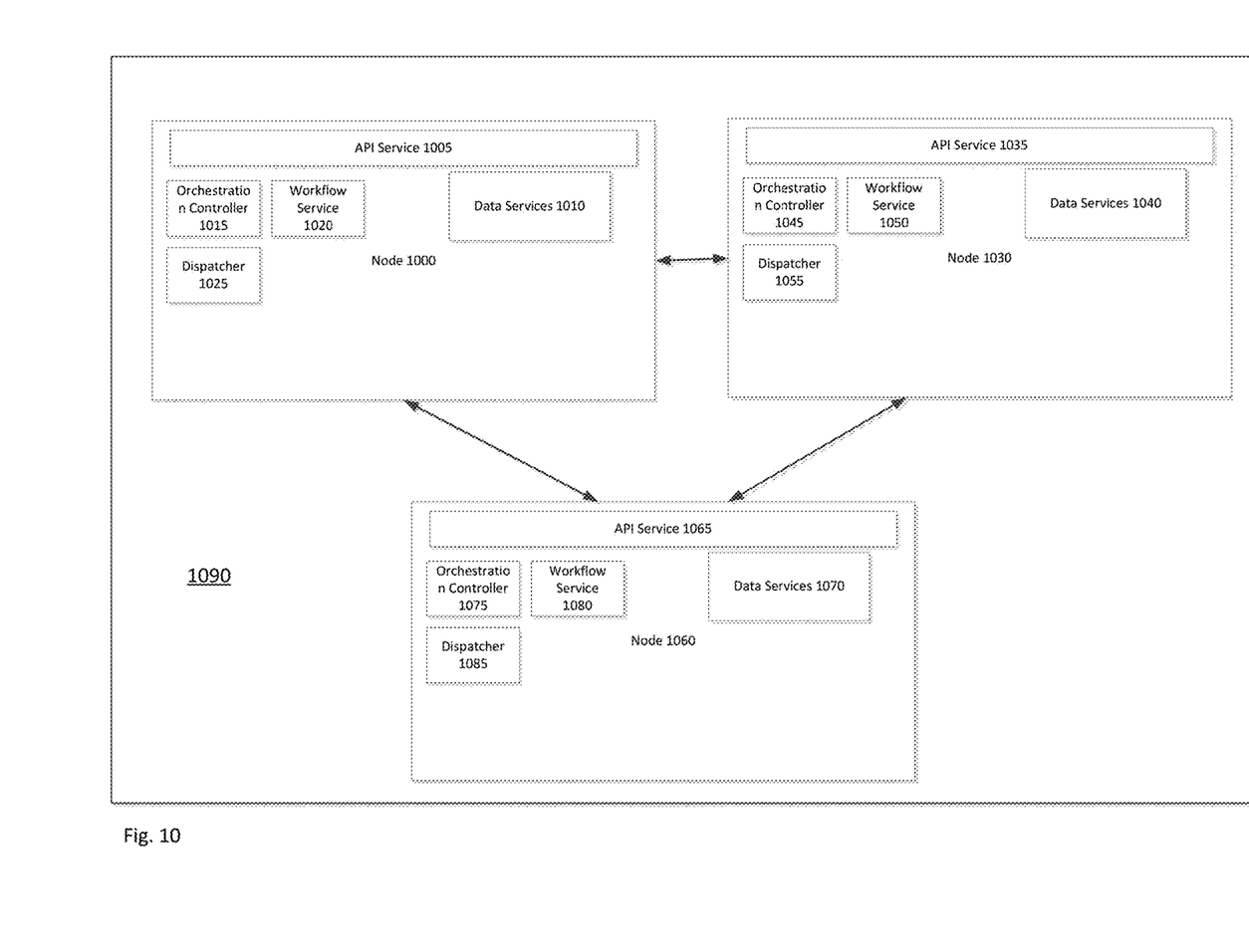
FIG. 10 is a simplified illustration of multiple nodes communicating within a data storage system, in accordance with an embodiment of the present disclosure.

Refer now to the example embodiment of FIG. 10. FIG. 10 is a simplified illustration of three nodes in a data storage system, in accordance with an embodiment of the present disclosure. As shown, data storage system 1090 includes nodes 1000, 1030, 1060. Each of the nodes 1000, 1030, 1060 is in communication with each other node 1000, 1030, 1060 within data storage system 1090. In this embodiment, node 1000 includes orchestration controller 1015, workflow service 1020, and dispatcher 1025. Node 1030 includes orchestration controller 1045, workflow service 1050, and dispatcher 1055. Node 1060 includes orchestration controller 1075, workflow service 1080, and dispatcher 1085. As shown, dispatcher 1025, dispatcher 1055, and dispatcher 1085 are in communication and synchronized across nodes 1000, 1030, 1060. As each workflow service sends steps to each respective dispatcher, each respective dispatcher enables visibility as to what executable tasks have been queued within dispatchers 1025, 1055, 1085. In this embodiments, dispatcher 1085 is enabled to execute steps queued by workflow services 1020, 1050, 1080.

As shown, if node 1030 receives a request to allocate a data service on node 1060, node 1030 sends a command to orchestration controller 1045 to allocate the data service. Orchestration controller 1045 creates and sends a workflow to workflow service 1050. Workflow service 1050 analyzes workflow and decomposes the workflow into individual steps. Workflow service 1050 sends each step to Dispatcher 1055 to be executed. Dispatcher 1055 synchronizes with dispatcher 1025 and dispatcher 1085 which enables node 1000, node 1030, or node 1060 to execute the step.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
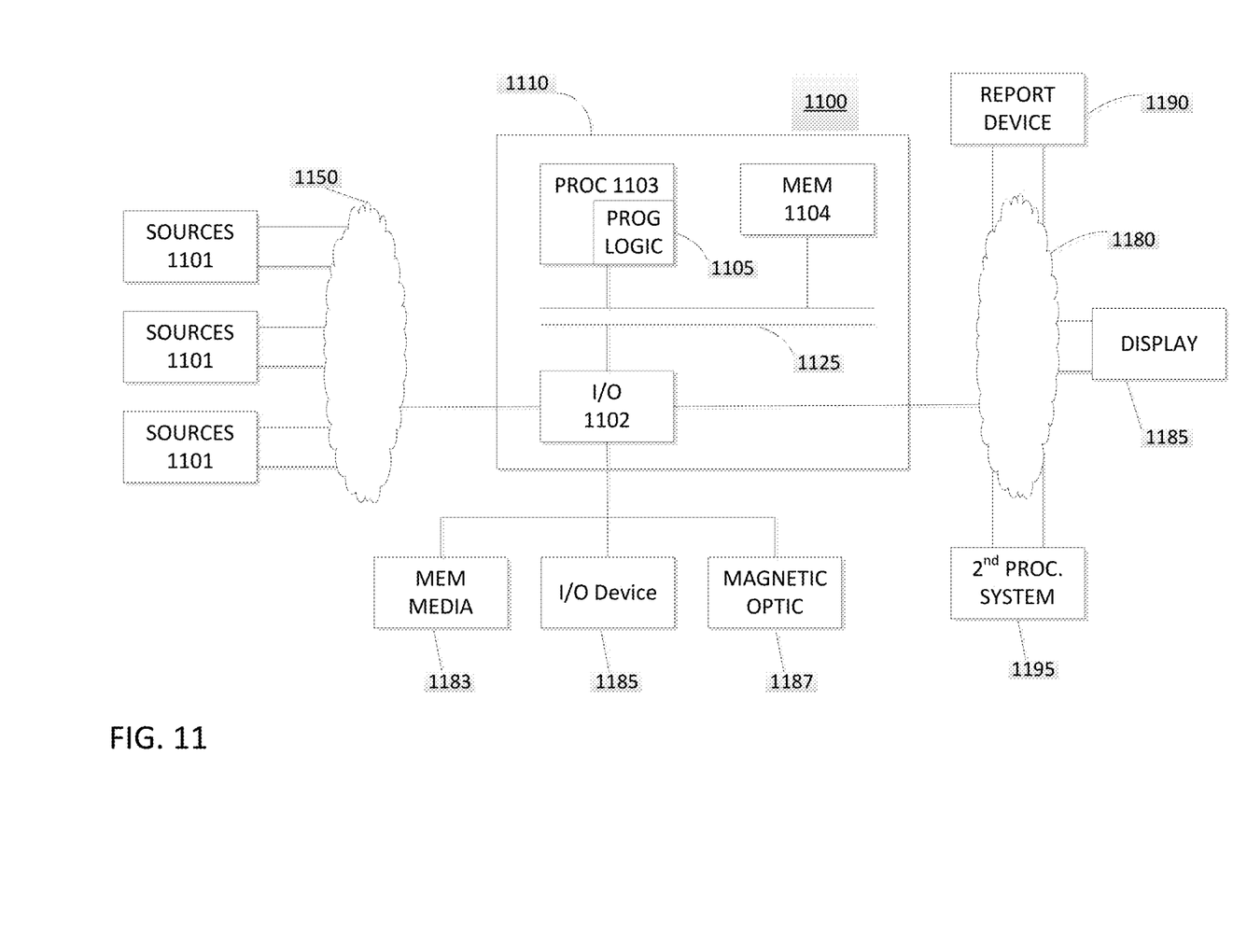
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The I/O port 1102 may provide connectivity to memory media 1183, I/O devices 1185, and drives 1187, such as magnetic or optical drives. When the program code is loaded into memory 1104 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
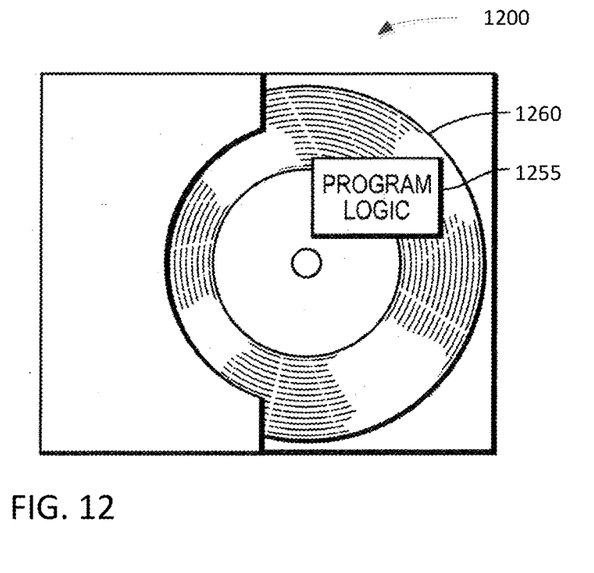
FIG. 12 is an example of a method embodied on a computer readable storage medium that may utilize the techniques described herein, in accordance with an embodiment of the present disclosure.

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for orchestrating a workflow, including one or more steps, for provisioning a data service on a data storage system, the data storage system including one or more sub-systems, the computer-executable method comprising:
   orchestrating the execution of the workflow on the data storage system by:
      analyzing the workflow to determine a dependency of each of the one or more steps for provisioning the data service wherein analyzing includes detecting whether one or more portions of the workflow are enabled to be executed serially or in parallel; and
      based on the dependency of each of the one or more steps, scheduling the one or more steps for execution on the one or more sub-systems of the data storage system, wherein a first step of the one or more steps scheduled on a first sub-system of the one or more sub-systems is executed serially with a second step of the one or more steps scheduled on the first sub-system;
      determining, at a sub-system of the sub-systems receiving a step of the one or more steps, whether to create a workflow based on the step;
      wherein the data storage system is enabled to dynamically add one or more steps to the workflow to enable the data storage system to roll back one or more portions of the workflow.

2. The computer-executable method of claim 1, wherein the scheduling of the one or more steps further comprises:
   scheduling a third step of the one or more steps on a second sub-system of the one or more sub-systems, wherein the third step is scheduled in parallel with the first step of the one or more steps.

3. The computer-executable method of claim 1, wherein the orchestrating further comprises:
   executing the one or more steps of the workflow;
   monitoring the one or more steps for a status, wherein if the first step of the one or more steps successfully completes, the second step executes; wherein if the first sub-system fails while executing the first step of the one or more steps, the first step restarts on a third sub-system of the one or more sub-systems.

4. The computer-executable method of claim 3, wherein if the first step of the one or more steps fails to successfully complete, the dependency of each of the one or more steps for provisioning the data storage volume is used to schedule one or more rollback steps.

5. The computer-executable method of claim 1, wherein each of the one or more steps for provisioning the data service is associated a rollback step, wherein the rollback step reverses an action of the associated step of the one or more steps.

6. The computer-executable method of claim 1, wherein each of the one or more sub-systems scheduled to execute one or more steps provides a status related to the one or more steps.

7. A system, comprising:
a data storage system having one or more sub-systems; and
computer-executable logic encoded in memory of one or more computers in communication with the data storage system to enable provisioning of a data service on the data storage system by orchestrating a workflow, the workflow including one or more steps, wherein the computer-executable logic is configured for the execution of:
orchestrating the execution of the workflow on the data storage system by:
analyzing the workflow to determine a dependency of each of the one or more steps for provisioning the data service wherein analyzing includes detecting whether one or more portions of the workflow are enabled to be executed serially or in parallel; and
based on the dependency of each of the one or more steps, scheduling the one or more steps for execution on the one or more sub-systems of the data storage system, wherein a first step of the one or more steps scheduled on a first sub-system of the one or more sub-systems is executed serially with a second step of the one or more steps scheduled on the first sub-system;
determining, at a sub-system of the sub-systems receiving a step of the one or more steps, whether to create a workflow based on the step;
wherein the data storage system is enabled to dynamically add one or more steps to the workflow to enable the data storage system to roll back one or more portions of the workflow.

8. The system of claim 7, wherein the scheduling of the one or more steps further comprises:
scheduling a third step of the one or more steps on a second sub-system of the one or more sub-systems, wherein the third step is scheduled in parallel with the first step of the one or more steps.

9. The system of claim 7, wherein the orchestrating further comprises:
executing the one or more steps of the workflow;
monitoring the one or more steps for a status, wherein if the first step of the one or more steps successfully completes, a third step of the one or more steps dependent on the first step executes; wherein if the first sub-system fails while executing the first step of the one or more steps, the first step restarts on a third sub-system of the one or more sub-systems.

10. The system of claim 9, wherein if the first step of the one or more steps fails to successfully complete, the dependency of each of the one or more steps for provisioning the data storage volume is used to schedule one or more rollback steps.

11. The system of claim 7, wherein each of the one or more steps for provisioning the data service is associated to a rollback step, wherein the rollback step reverses an action of the associated step of the one or more steps.

12. The system of claim 7, wherein each of the one or more sub-systems scheduled to execute one or more steps provides a status related to the one or more steps.

13. A computer program product for orchestrating a workflow, including one or more steps, for provisioning a data service on a data storage system, the data storage system including one or more sub-systems, the computer program product comprising:
orchestrating the execution of the workflow on the data storage system by:
analyzing the workflow to determine a dependency of each of the one or more steps for provisioning the data service wherein analyzing includes detecting whether one or more portions of the workflow are enabled to be executed serially or in parallel; and
based on the dependency of each of the one or more steps, scheduling the one or more steps for execution on the one or more sub-systems of the data storage system, wherein a first step of the one or more steps scheduled on a first sub-system of the one or more sub-systems is executed serially with a second step of the one or more steps scheduled on the first sub-system;
determining, at a sub-system of the sub-systems receiving a step of the one or more steps, whether to create a workflow based on the step;
wherein the data storage system is enabled to dynamically add one or more steps to the workflow to enable the data storage system to roll back one or more portions of the workflow.

14. The computer program product of claim 13, wherein the scheduling of the one or more steps further comprises:
scheduling a third step of the one or more steps on a second sub-system of the one or more sub-systems, wherein the third step is scheduled in parallel with the first step of the one or more steps.

15. The computer program product of claim 13, wherein the orchestrating further comprises:
executing the one or more steps of the workflow;
monitoring the one or more steps for a status, wherein if the first step of the one or more steps successfully completes, a third step of the one or more steps dependent on the first step executes; wherein if the first sub-system fails while executing the first step of the one or more steps, the first step restarts on a third sub-system of the one or more sub-systems.

16. The computer program product of claim 15, wherein if the first step of the one or more steps fails to successfully complete, the dependency of each of the one or more steps for provisioning the data storage volume is used to schedule one or more rollback steps.

17. The computer program product of claim 13, wherein each of the one or more steps for provisioning the data service is associated a rollback step, wherein the rollback step reverses an action of the associated step of the one or more steps.

18. The computer program product of claim 13, wherein each of the one or more sub-systems scheduled to execute one or more steps provides a status related to the one or more steps.

* * * * *